(12) United States Patent
Reimer et al.

(10) Patent No.: US 11,906,640 B2
(45) Date of Patent: Feb. 20, 2024

(54) SYSTEM AND METHOD FOR FUSING SENSOR AND SATELLITE MEASUREMENTS FOR POSITIONING DETERMINATION

(71) Applicant: Swift Navigation, Inc., San Francisco, CA (US)

(72) Inventors: Christian Reimer, San Francisco, CA (US); Joseph Angelo, San Francisco, CA (US); Sebastien Carcanague, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 18/115,963

(22) Filed: Mar. 1, 2023

(65) Prior Publication Data
US 2023/0280476 A1    Sep. 7, 2023

Related U.S. Application Data (60) Provisional application No. 63/315,241, filed on Mar. 1, 2022.

(51) Int. Cl.
*G01S 19/47* (2010.01)
*G01S 19/41* (2010.01)
(Continued)

(52) U.S. Cl.
CPC ............. *G01S 19/47* (2013.01); *G01S 19/28* (2013.01); *G01S 19/33* (2013.01); *G01S 19/396* (2019.08); *G01S 19/41* (2013.01); *G01S 19/43* (2013.01)

(58) Field of Classification Search
None
See application file for complete search history.

(56) References Cited

U.S. PATENT DOCUMENTS 5,610,614 A    3/1997   Talbot et al.
6,317,688 B1   11/2001  Bruckner et al.
(Continued)

FOREIGN PATENT DOCUMENTS

CA    2718988 C    1/2014
CA    3079279 A1   10/2020
(Continued)

OTHER PUBLICATIONS

P.S. Maybeck, Stochastic models, estimation, and control, vol. 1, Academic Press, p. 1-16, 133-134, 169-176, 203-220, 275-276, 289-306, 341-362, 411-423 (Year: 1979).*
(Continued)

*Primary Examiner* — Bernarr E Gregory
*Assistant Examiner* — Fred H Mull
(74) *Attorney, Agent, or Firm* — Jeffrey Schox; Randy Mehlenbacher (57) ABSTRACT

A method can include receiving a set of satellite signals, refining the set of satellite signals to generate a refined set of satellite signals, determining a satellite solution for each satellite associated with a satellite signal in the refined set of satellite signals, applying an a-priori correction to the satellite signals, determining a set of time differenced satellite signals between the satellite signals from a current epoch and a previous epoch; and determining the positioning solution of the rover using a fusion engine that processes the differenced satellite signals and inertial measurement unit (IMU) data.

21 Claims, 6 Drawing Sheets

(51) Int. Cl.
*G01S 19/28* (2010.01)
*G01S 19/43* (2010.01)
*G01S 19/33* (2010.01)
*G01S 19/39* (2010.01)

(56) References Cited

U.S. PATENT DOCUMENTS

| | | |
|---|---|---|
| 6,427,122 B1 | 7/2002 | Lin |
| 6,453,237 B1 | 9/2002 | Fuchs et al. |
| 6,552,680 B1 | 4/2003 | Barber et al. |
| 6,647,340 B1 | 11/2003 | Pemble et al. |
| 6,691,066 B1 | 2/2004 | Brodie |
| 6,856,905 B2 | 2/2005 | Pasturel et al. |
| 6,864,836 B1 | 3/2005 | Hatch et al. |
| 7,026,982 B2 | 4/2006 | Toda et al. |
| 7,219,013 B1 | 5/2007 | Young et al. |
| 7,289,061 B2 | 10/2007 | Komjathy et al. |
| 7,292,183 B2 | 11/2007 | Bird et al. |
| 7,409,289 B2 | 8/2008 | Coatantiec et al. |
| 7,538,721 B2 | 5/2009 | Vollath et al. |
| 7,692,578 B2 | 4/2010 | Vollath et al. |
| 7,696,922 B2 | 4/2010 | Nicholson et al. |
| 8,089,402 B2 | 1/2012 | Maenpa et al. |
| 8,094,065 B2 | 1/2012 | Henkel |
| 8,193,976 B2 | 6/2012 | Shen et al. |
| 8,255,155 B1 | 8/2012 | Crane et al. |
| 8,416,133 B2 | 4/2013 | Hatch et al. |
| 8,447,517 B2 | 5/2013 | Roh |
| 8,542,146 B2 | 9/2013 | Vollath |
| 8,610,624 B2 | 12/2013 | Savoy |
| 8,756,001 B2 | 6/2014 | Georgy et al. |
| 8,760,343 B2 | 6/2014 | Milyutin et al. |
| 8,825,456 B2 | 9/2014 | Vasudevan et al. |
| 8,860,609 B2 | 10/2014 | Roh |
| 8,996,311 B1 | 3/2015 | Morin et al. |
| 9,031,782 B1 | 5/2015 | Lemay et al. |
| 9,069,073 B2 | 6/2015 | Ramakrishnan et al. |
| 9,128,176 B2 | 9/2015 | Seeger |
| 9,182,497 B2 | 11/2015 | Geier et al. |
| 9,405,012 B2 | 8/2016 | Doucet et al. |
| 9,405,016 B2 | 8/2016 | Yim |
| 9,417,330 B2 | 8/2016 | Revol et al. |
| 9,488,734 B2 | 11/2016 | Davain |
| 9,557,422 B1 | 1/2017 | Miller et al. |
| 9,568,321 B2 | 2/2017 | Bharadwaj et al. |
| 9,602,974 B2 | 3/2017 | Rudow et al. |
| 9,612,341 B2 | 4/2017 | Large et al. |
| 9,709,683 B2 | 7/2017 | Leandro et al. |
| 9,784,844 B2 | 10/2017 | Kana et al. |
| 9,927,530 B2 | 3/2018 | Boyarski |
| 10,018,729 B2 | 7/2018 | Dunik et al. |
| 10,101,464 B2 | 10/2018 | Appleford et al. |
| 10,260,888 B2 | 4/2019 | Takahashi |
| 10,267,924 B2 | 4/2019 | Ramanandan et al. |
| 10,274,606 B1 | 4/2019 | Phan et al. |
| 10,422,885 B2 | 9/2019 | Dai et al. |
| 10,459,593 B2 | 10/2019 | Tiwari et al. |
| 10,578,747 B2 | 3/2020 | Grgich et al. |
| 10,677,933 B1 | 6/2020 | Gavrilets et al. |
| 10,802,160 B2 | 10/2020 | Dai et al. |
| 10,809,388 B1 | 10/2020 | Carcanague et al. |
| 10,901,096 B2 | 1/2021 | Thrasher et al. |
| 11,156,718 B2 | 10/2021 | Takeda |
| 11,187,813 B2 | 11/2021 | Brandl et al. |
| 11,327,182 B2 | 5/2022 | Zalewski et al. |
| 11,422,269 B2 | 8/2022 | Ookubo et al. |
| 11,422,271 B2 | 8/2022 | Talbot et al. |
| 11,480,690 B2 | 10/2022 | Grgich et al. |
| 11,550,067 B2 | 1/2023 | Reimer et al. |
| 2003/0085840 A1* | 5/2003 | Benner ............... G01S 7/4004 342/450 |
| 2005/0001762 A1 | 1/2005 | Han et al. |
| 2005/0001763 A1 | 1/2005 | Han et al. |
| 2005/0024263 A1 | 2/2005 | Sharpe et al. |
| 2005/0114023 A1 | 5/2005 | Williamson et al. |
| 2008/0205521 A1 | 8/2008 | Van |
| 2009/0018772 A1 | 1/2009 | Watanabe et al. |
| 2009/0184869 A1 | 7/2009 | Talbot et al. |
| 2009/0273511 A1 | 11/2009 | Schroth |
| 2010/0033370 A1 | 2/2010 | Lopez et al. |
| 2010/0164789 A1 | 7/2010 | Basnayake |
| 2010/0283675 A1 | 11/2010 | Mcaree et al. |
| 2010/0324822 A1* | 12/2010 | Coatantiec ............ G01S 19/47 701/472 |
| 2011/0050497 A1 | 3/2011 | Maenpa et al. |
| 2011/0090116 A1 | 4/2011 | Hatch et al. |
| 2011/0122022 A1 | 5/2011 | Van et al. |
| 2011/0140959 A1 | 6/2011 | Vollath |
| 2011/0148698 A1 | 6/2011 | Vollath |
| 2011/0187589 A1 | 8/2011 | Gaal et al. |
| 2011/0187590 A1 | 8/2011 | Leandro |
| 2011/0316740 A1 | 12/2011 | Waters et al. |
| 2012/0154210 A1 | 6/2012 | Landau et al. |
| 2012/0173195 A1 | 7/2012 | Opshaug et al. |
| 2012/0176271 A1 | 7/2012 | Dai et al. |
| 2013/0050020 A1 | 2/2013 | Peck et al. |
| 2013/0099970 A1 | 4/2013 | Lin et al. |
| 2013/0227377 A1 | 8/2013 | Rao et al. |
| 2013/0234885 A1 | 9/2013 | Geier et al. |
| 2013/0265191 A1 | 10/2013 | Ghinamo |
| 2013/0271318 A1 | 10/2013 | Landau et al. |
| 2013/0335264 A1 | 12/2013 | Revol et al. |
| 2014/0015712 A1 | 1/2014 | Leandro et al. |
| 2014/0062765 A1 | 3/2014 | Brenner |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2014/0288825 A1 | 9/2014 | Czompo et al. |
| 2014/0375495 A1 | 12/2014 | Fleming et al. |
| 2015/0019464 A1 | 1/2015 | Nguyen-Tuong et al. |
| 2015/0173037 A1 | 6/2015 | Pijl |
| 2015/0260848 A1 | 9/2015 | Mundt et al. |
| 2015/0270615 A1 | 9/2015 | Neenan |
| 2015/0293230 A1 | 10/2015 | Weed et al. |
| 2015/0293233 A1 | 10/2015 | De Jong |
| 2015/0369924 A1 | 12/2015 | Hedgecock et al. |
| 2016/0011318 A1 | 1/2016 | Cohen |
| 2016/0097859 A1 | 4/2016 | Hansen et al. |
| 2016/0195617 A1 | 7/2016 | Phatak et al. |
| 2017/0269216 A1 | 9/2017 | Dai et al. |
| 2017/0269222 A1 | 9/2017 | Dai et al. |
| 2017/0269231 A1 | 9/2017 | Dai et al. |
| 2017/0299730 A1 | 10/2017 | Lie et al. |
| 2017/0322313 A1 | 11/2017 | Revol et al. |
| 2018/0113219 A1 | 4/2018 | Wuebbena |
| 2018/0120445 A1 | 5/2018 | Dill |
| 2018/0164442 A1 | 6/2018 | Thrasher et al. |
| 2018/0172838 A1 | 6/2018 | Junker et al. |
| 2018/0188032 A1 | 7/2018 | Ramanandan et al. |
| 2018/0246217 A1 | 8/2018 | Wuebbena |
| 2018/0252818 A1 | 9/2018 | Sato et al. |
| 2018/0283882 A1 | 10/2018 | He et al. |
| 2018/0299562 A1 | 10/2018 | Green |
| 2018/0306930 A1 | 10/2018 | Laine et al. |
| 2019/0004180 A1 | 1/2019 | Jokinen |
| 2019/0078895 A1 | 3/2019 | Ma et al. |
| 2019/0154837 A1 | 5/2019 | Noble et al. |
| 2019/0187295 A1 | 6/2019 | Lee et al. |
| 2019/0187298 A1 | 6/2019 | Grgich et al. |
| 2019/0204450 A1 | 7/2019 | Revol |
| 2019/0243001 A1 | 8/2019 | Ookubo et al. |
| 2019/0302274 A1 | 10/2019 | Berntorp et al. |
| 2019/0339396 A1 | 11/2019 | Turunen |
| 2020/0025936 A1 | 1/2020 | Zhou et al. |
| 2020/0025937 A1 | 1/2020 | Kroeger et al. |
| 2020/0041654 A1 | 2/2020 | Noble et al. |
| 2020/0096649 A1 | 3/2020 | Brandl et al. |
| 2020/0209406 A1 | 7/2020 | Lin et al. |
| 2020/0233056 A1 | 7/2020 | Dolgov et al. |
| 2020/0257002 A1 | 8/2020 | Henkel |
| 2020/0348422 A1 | 11/2020 | Carcanague et al. |
| 2021/0026374 A1 | 1/2021 | Burghardt et al. |
| 2021/0033735 A1 | 2/2021 | Kleeman |
| 2021/0116579 A1 | 4/2021 | Rezaei |

(56) References Cited

U.S. PATENT DOCUMENTS

| | | | |
|---|---|---|---|
| 2021/0165104 | A1 | 6/2021 | Zalewski et al. |
| 2021/0165111 | A1 | 6/2021 | Zalewski |
| 2021/0215831 | A1 | 7/2021 | Takeda |
| 2021/0255336 | A1 | 8/2021 | Noble et al. |
| 2021/0405213 | A1 | 12/2021 | Tuck et al. |
| 2022/0058322 | A1 | 2/2022 | Brandl et al. |
| 2022/0163677 | A1 | 5/2022 | Muthuraman et al. |
| 2022/0397684 | A1 | 12/2022 | Kee et al. |

FOREIGN PATENT DOCUMENTS

| | | | | |
|---|---|---|---|---|
| CN | 101166995 | A | | 4/2008 |
| CN | 103197327 | A | | 7/2013 |
| CN | 103760573 | A | | 4/2014 |
| CN | 104236522 | A | | 12/2014 |
| CN | 104732085 | A | | 6/2015 |
| CN | 106970404 | A | | 7/2017 |
| CN | 105629263 | B | | 4/2019 |
| CN | 107422354 | B | | 6/2019 |
| CN | 111272174 | A | | 6/2020 |
| CN | 109714421 | B | | 8/2021 |
| CN | 111624630 | B | * | 2/2022 ............ G01S 19/28 |
| CN | 114174850 | A | | 3/2022 |
| EP | 0244091 | A2 | | 11/1987 |
| EP | 0461557 | B1 | * | 3/1997 ............ G01S 19/28 |
| EP | 1729145 | A1 | | 12/2006 |
| EP | 2128841 | A1 | | 12/2009 |
| EP | 2602752 | A1 | | 6/2013 |
| EP | 1839070 | B2 | | 4/2014 |
| EP | 2966477 | A1 | | 1/2016 |
| EP | 3627188 | A1 | | 3/2020 |
| EP | 3566021 | B1 | | 3/2021 |
| EP | 3865915 | A1 | * | 8/2021 |
| IN | 110727002 | A | | 1/2020 |
| KR | 101181990 | B1 | | 9/2012 |
| WO | 2017046914 | A1 | | 3/2017 |
| WO | 2017070732 | A1 | | 5/2017 |
| WO | 2020214680 | A1 | | 10/2020 |
| WO | 2020240307 | A1 | | 12/2020 |

OTHER PUBLICATIONS

C.A. Ogaja, Applied GPS for Engineers and Project Managers, ASCE Press, p. 177-179 (Year: 2011).*

J. Geng et al., Toward global instantaneous decimeter-level positioning using tightly coupled multi-constellation andmulti-frequency GNSS, Journal of Geodesy, vol. 92, p. 977-991 (Year: 2019).*

IS-GPS-200L, NAVSTAR GPS Space Segment/Navigation User Segment Interfaces, 228 pages (Year: 2020).*

N. Pongsakornsathien et al., A Performance-Based Airspace Model for Unmanned Aircraft Systems Traffic Management, Aerospace, vol. 7(154), 26 pages (Year: 2020).*

Wikipedia (Covariance matrix), https://en.wikipedia.org/wiki/Covariance_matrix, downloaded May 2, 2023 (Year: 2023).*

S.I. Roumeliotis et al., Stochastic Cloning: A generalized framework for processing relative state measurements, Proceedings of the 2002 IEEE International Conference on Robotics & Automation, p. 1788-1795 (Year: 2002).*

T. Emter et al., Stochastic Cloning for Robust Fusion of Multiple Relative and Absolute Measurements, 2019 IEEE Intelligent Vehicles Symposium (IV), p. 1782-1788 (Year: 2019).*

"An Introduction to GNSS, Chapter 4, GNSS Error Sources", https://novatel.com/an-introduction-to-gnss/chapter-4-gnsserror-sources, published 2015, 1 page.

"Geo++ SSR for Network-RTK, PPP and PPP-RTK", https://geopp.de/wp-content/uploads/2020/09/SSR_Flyer_v3.pdf, Sep. 2015.

"IGS State Space Representation (SSR) Format Version 1.00", International GNSS Service (IGS), Oct. 5, 2020.

"Integrity-Navipedia", https://gssc.esa.int/navipedia/index.php/Integrity, published 2011.

"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.

"Raim", GMV, 2011, RAIM.

"Safe Position Augmentation for Real-Time Navigation (SPARTN) Interface Control Document Version 1.8.0", Jan. 2020, Sapcorda Services GmbH.

"Swift Navigation Binary Protocol", Version 3.4.5, Mar. 10, 2021, pp. 1-156.

Altmayer, Christian, "Cycle Slip Detection and Correction by Means of Integrated Systems", ION Institute of Navigation, Proceedings of the 200 National Technical Meeting of the Institute of Navigation, Abstract, Jan. 26-28, 2000, abstract only 4 pages.

Berntorp, Karl, et al., "Bayesian Sensor Fusion of GNSS and Camera With Outlier Adaptation for Vehicle Positioning", Mitsubishi Electric Research Laboratories, https://www.merl.com, Aug. 6, 2022.

Blanch, Juan, et al., "RAIM with Optimal Integrity and Continuity Allocations Under Multiple Failures", IEEE Transactions on Aerospace and Electronic Systems, vol. 46, No. 3, Jul. 2010.

Boda, Aaron, "Cycle Slip Detection using PVA Kalman Filter", Technical Report • Dec. 2017.

Brack, A., "Optimal Estimation of a Subset of Integers With Application to GNSS", Artificial Satellites, vol. 51, No. 4—2016 DOI: 10.1515/arsa-2016-0011.

Brocard, Philippe, "Integrity monitoring for mobile users in urban environment", https://tel.archives-ouvertes.fr/tel-01379632/document, submitted Oct. 11, 2016.

Bruno, Jon, et al., "A realistic simulation framework to evaluate ionospheric tomography", Advances in Space Research 65 (2020) 891-901.

Cassel, Ryan, "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.

Chiu, David S., et al., "Bierman-Thorton UD Filtering for Double-Differenced Carrier Phase Estimation Accounting for Full Mathematical Correlation", Jan. 2008, ION NTM 2008, pp. 756-762., Jun. 23, 2017 00:00:00.0.

Davidson, Pavel, et al., "Improved Vehicle Positioning in Urban Environment through Integration of GPS and Low-Cost Inertial Sensors", European Navigation Conference, ENC-GNSSAt: Naples, Italy, May 2009.

Ding, Wei, et al., "Carrier Phase-Based Precise Heading and Pitch Estimation Using a Low-Cost GNSS Receiver", Remote Sens. 2021, 13,3642. https://doi.org/ 10.3390/rs13183642.

Drescher, Ralf, "Fast convergence of Trimble CenterPoint RTX by regional augmentation", Trimble Terrasat GmbJ, Munich, EGU General Assembly 2015, Vienna, Thursday, Apr. 16, 2015.

Farrell, James L., "Carrier Phase Processing Without Integers", Ion 57th Annual Meeting/CIGTF 20th Biennial Guidance Test Symposium, Jun. 11-13, 2001, Albuquerque, NM.

Favey, Etienne, et al., "Dead reckoning fills-in GPS navigation gap", EE Times, Automotive Designline, Aug. 18, 2011.

Feng, Shaun, et al., "Carrier phase-based integrity monitoring for high-accuracy positioning", GPS Solution, Apr. 2009.

Freda, Peirluigi, et al., "Time-differenced carrier phases technique for precise GNSS velocity estimation", GPS Solut, DOI 10.1007/s10291-014-0425-1, published online Dec. 31, 2014.

Gratton, Livio, et al., "Carrier Phase Relative RAIM Algorithms and Protection Level Derivation", Journal of Navigation (2010), 63, 215-231, doi: 10.1017/S0373463309990403.

Gunning, Kazuma, et al., "Design and evaluation of integrity algorithms for PPP in kinematic applications", Proceedings of the 31st International Technical Meeting of the Satellite Division of the Institute of Navigation (ION GNSS+ 2018) Sep. 24-28, 2018, Hyatt Regency Miami, Miami, Florida.

Henkel, Patrick, et al., "Joint L-/C-Band Code and Carrier Phase Linear Combinations for Galileo", International Journal of Navigation and Observation, vol. 2008, Article ID 651437, 8 pages.

(56) References Cited

OTHER PUBLICATIONS

Hirokawa, Dr. Rui , "Recent Activity of International Standardization for High-Accuracy GNSS Correction Service", Mitsubishi Electric, Jun. 27, 2019.
Huang, Panpan , "Airborne GNSS PPP Based Pseudolite System", School of Civil and Environmental Engineering Faculty of Engineering UNSW. Jun. 2019.
Karaim, Malek , et al., "GNSS Error Sources", https://www.intechopen.com/books/multifunctional-operation-and-application-of-gps/gnss-error-sources, published Apr. 6, 2018.
Karaim, Malek , et al., "GPS Cycle Slip Detection and Correction at Measurement Level", British Journal of Applied Science & Technology 4(29): 4239-4251, 2014.
Khanafseh, Samer , et al., "GNSS Multipath Error Modeling for Automotive Applications", Abstract only, Proceedings of the 31st International Technical Meeting of the Satellite Division of the Institute of Navigation (ION GNSS+ 2018), Miami, Florida, Sep. 2018, pp. 1573-1589, https://www.ion.org/publications/abstract.cfm?articleID=16107, 2 pages.
Kilic, Cagri , et al., "ZUPT Aided GNSS Factor Graph with Inertial Navigation Integration for Wheeled Robots", Proceedings of the 34th International Technical Meeting of the Satellite Division of the Institute of Navigation (ION GNSS+ 2021) Sep. 20-24, 2021, abstract only, 2 pages.
Kim, Jungbeom , et al., "A Low-Cost High-Precision Vehicle Navigation System for Urban Environment Using Time Differenced Carrier Phase Measurements", Proceedings of the 2020 International Technical Meeting, 597 ION ITM 2020, San Diego, California, Jan. 21-24, 2020, https://doi.org/10.33012/2020.17164.
Kissai, Ali , et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.
Ko, Jonathan , et al., "GP-UKF: Unscented kalman filters with Gaussian process prediction and observation models", Conference Paper, Dec. 2007, 10.1109/IROS.2007.4399284.
Kuusniemi, Heidi , et al., "GNSS Signal Reliability Testing in Urban and Indoor Environments", Proceedings of NTM 2004 Conference (Session A2), San Diego, CA, Jan. 26-28, 2004, The Institute of Navigation.
Lee, Jae Ho , et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages, abstract only.
Lei, Yu , et al., "Prediction of Navigation Satellite Clock Bias by Gaussian Process Regression", Lecture Notes in Electrical Engineering 342:411-423, Jan. 2015, abstract only, 5 pages.
Li, T. , et al., "Some remarks on GNSS integer ambiguity validation methods", Survey Review, Dec. 5, 2012, vol. 44, No. 326.
Lin, Ming , et al., "Robust Gaussian Process Regression for Real-Time High Precision GPS Signal Enhancement", www.gps.gov/systems/gps/performance/accuracy, Jun. 5, 2019.
Liu, Haiying , et al., "A closed-loop EKF and multi-failure diagnosis approach for cooperative GNSS positioning", Engineering, GPS Solutions, Published 2015.
Madani, Kurosh , et al., "Studies in Computational Intelligence", Revised and Selected Papers of the International Joint Conference, IJCCI 2011, Paris, France, Oct. 24-26, 2011.
Madrid, Navarro , et al., "New Approach for Integrity Bounds Computation Applied to Advanced Precise Positioning Applications", Proceedings of the 28th International Technical Meeting of the Satellite Division of the Institute of Navigation (ION GNSS+ 2015) Sep. 14-18, 2015, Tampa Convention Center, Tampa, Florida.
Meng, Xiaoli , et al., "A Robust Vehicle Localization Approach Based on GNSS/IMU/DMI/LiDAR Sensor Fusion for Autonomous Vehicles", Sensors, 2017, 17, 2140.
Odijk, Dennis , et al., "On the estimability of parameters in undifferenced, uncombined GNSS network and PPP-RTK user models by means of S-system theory", Journal of Geodesy, Nov. 2015.

Peng, Hao , et al., "Covariance Fusion Strategy of Gaussian Processes Covariance and Orbital Prediction Uncertainty", Conference: AAS/AIAA Astrodynamics Specialist Conference, Portland, ME, Aug. 2019, abstract only, 7 pages.
Pervan, Boris , et al., "Shaping Aviation Integrity Two RAIMs for Safety", GPS World the Business and Technology of Global Navigation and Positioning, Apr. 1, 2008.
Petovello, Mark , "How does a GNSS receiver estimate velocity?", Inside GNSS, Mar./Apr. 2015, www.insidegnss.com.
Phelts, R. Eric, et al., "Innovation: Improving ARAIM, An approach using precise point positioning", GPS World, Jun. 13, 2020, https://www.gpsworld.com/innovation-improving-araim/.
Tanedo, Flip , "Notes on non-holonomic constraints", For P3318, Spring 2013, https://www.physics.uci.edu/~tanedo/files/teaching/P3318S13/Sec_05_nonholonomic.pdf.
Won, Dachee , et al., "Performance Improvement of Inertial Navigation System by Using Magnetometer with Vehicle Dynamic Constraints", Hindawi, vol. 2015 | Article ID 435062 | https://doi.org/10.1155/2015/435062, https://www.hindawi.com/journals/js/2015/435062/.
Pullen, Sam , "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.
Rasmussen, C.E. , et al., "Gaussian Processes for Machine Learning", MIT Press, 2006, ISBN 026218253X. c 2006 Massachusetts Institute of Technology, (Year: 2006).
Rodriguez-Solano, Carlos , et al., "Protection Level of the Trimble RTX Positioning Engine for Autonomous Applications", Proceedings of the 34th International Technical Meeting of the Satellite Division of the Institute of Navigation (ION GNSS+ 2021), Sep. 20-24, 2021, abstract only, 2 pages.
Rothacher, M. , et al., "ANTEX: The Antenna Exchange Format, Version 1.4", Sep. 15, 2010, IGC International GNSS Service, https://kb.igs.org/hc/en-us/articles/216104678-ANTEX-format-description.
Roysdon, Paul F., et al., "GPS-INS Outlier Detection & Elimination using a Sliding Window Filter", 2017 American Control Conference (ACC), May 24-26, 2017, Seattle, WA, USA.
Satirapod, Chalermchon , "Improving the GPS Data Processing Algorithm for Precise Static Relative Positioning", School of Surveying and Spatial Information Systems the University of New South Wales. Jan. 2002.
Schmid, R. , et al., "Estimation of elevation-dependent satellite antenna phase center variations of GPS satellites", Journal of Geodesy (2003) 77: 440-446, May 19, 2003, DOI 10.1007/s00190-003-0339-0.
Schmid, Ralf , et al., "From Relative Absolute Antenna Phase Center Corrections", Conference: IGS Workshop and Symposium 2004.
Schmid, Ralf , "How to Use IGS Antenna Phase Center Corrections", GPS World Tech Talk, Feb. 3, 2010.
Schmitz, Martin , "RTCM State Space Representation Messages, Status and Plans", PPP-RTK & Open Standards Symposium, Mar. 12-13, 2012, Frankfurt, Germany.
Shapiro, Larry S., et al., "Rejecting Outliers and Estimating Errors in an Orthogonal-Regression Framework", Phil. Trans. R. Soc. Load. A (1995)350, 407-439. (Year:1995).
Skog, Isaac , et al., "A Low-Cost GPS Aided Inertial Navigation System for Vehicle Applications", 2005 13th European Signal Processing Conference, Sep. 4-8, 2005.
Snelson, Edward , et al., "Sparse Gaussian Process using Pseudo-inputs", NIPS'05: Proceedings of the 18th International Conference on Neural Information Processing Systems, Dec. 2005, pp. 1257-1264.
Subirana, J. Sanz, et al., "Carrier Phase Cycle-Slip Detection—Navipedia", https://gssc.esa.int/navipedia/index.php/Carrier_Phase_Cycle-Slip_Detection, published 2011.
Takasu, Tomoji , et al., "ION GNSS 2008 abstract submission Cycle slip detection and fixing by MEMS IMU/GPS integration for mobile environment RTK-GPS", Tokyo University of Marine Science and Technology, ION GNSS 2008, abstract submission.

(56) References Cited

OTHER PUBLICATIONS

Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation a Framework for GNSS Ambiguity Acceptance Testing", InsideGNSS, Mar./Apr. 2011, pp. 66-73, www.insidegnss.com.

Teunissen, P.J.G., "On the GPS widelane and its decorrelating property", Delft Geodetic Computing Centre, Journal of Geodesy (1997) 71: 577-587, abstract only, 2 pages.

Thombre, Sarang, et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.

Titsias, Michael K., "Variational Learning of Inducing Variables in Sparse Gaussian Processes", http://proceedings.mlr.press/v5/titsias09a/titsias09a.pdf, 2009.

Urquhart, Landon, "An Analysis of Multi-Frequency Carrier Phase Linear Combinations for GNSS", Department of Geodesy and Geomatics Engineering, University of New Brunswick, Technical Report No. 263, Feb. 2009.

Urquhart, Landon, et al., "Innovation: Integrity for safe navigation", https://www.gpsworld.com/innovation-integrity-for-safe-navigation-provided-by-gnss-service/, GPS World, Feb. 12, 2020.

Van Diggelen, Frank, et al., "Google to improve urban GPS accuracy for apps", Dec. 9, 2020, Android Developers Blog.

Van Graas, Frank, et al., "Precise Velocity Estimation Using a Stand-Alone GPS Receiver", Abstract only, Journal of the Institute of Navigation, vol. 51, No. 4, Winter 2004-2005, pp. 283-292, https://www.ion.org/publications/abstract.cfm?articleID=102384, 2 pages.

Verhagen, S., "The GNSS integer ambiguities: Estimation and validation", Aerospace Engineering, Jan. 31, 2005.

Waserman, Eyal, et al., "A Mixed Integer Least-Squares Formulation of the GNSS Snapshot Positioning Problem", https://github.com/eyalw711/snapshot-positioning, Jun. 2, 2021.

Wendel, J., et al., "Time-Differenced Carrier Phase Measurements for Tightly Coupled GPS/INS Integration", 0-7803-9454-2/06/$20.00/ © 2006 IEE, Jul. 5, 2006, 2006 IEEE/ION Position, Location, and Navigation Symposium, Date of Conference: Apr. 25-27, 2006.

Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.

Zair, Salim, et al., "Outlier Detection in GNSS Pseudo-Range/Doppler Measurements for Robust Localization", Sensors 2016, 16, 580; doi:10.3390/s16040580, www.mdpi.com/journal/sensors.

Zhu, Ni, et al., "GNSS Position Integrity in Urban Environments: A Review of Literature", IEEE Transactions on Intelligent Transportation Systems, 2018, 17p., 10.1109/TITS.2017.2766768.hal-01709519.

Angelo, Joseph, et al., "System and Method for Detecting Outliers in GNSS Obervations", U.S. Appl. No. 18/116,117, filed Mar. 1, 2023.

\* cited by examiner

SYSTEM AND METHOD FOR FUSING SENSOR AND SATELLITE MEASUREMENTS FOR POSITIONING DETERMINATION

CROSS-REFERENCE TO RELATED APPLICATIONS

This application claims the benefit of U.S. Provisional Application No. 63/315,241, filed 1 Mar. 2022, which is incorporated in its entirety by this reference.

TECHNICAL FIELD

This invention relates generally to the satellite positioning field, and more specifically to a new and useful system and method in the satellite positioning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
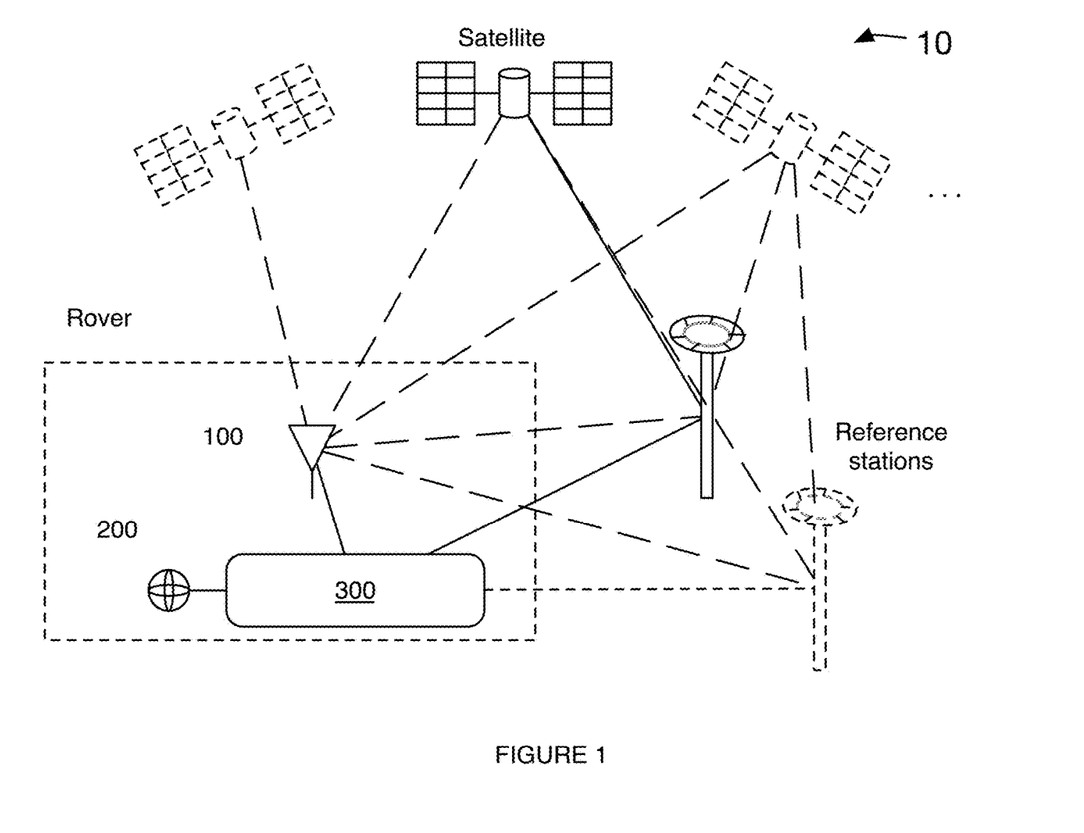
FIG. 1 is a schematic representation of the system.

As shown in FIG. 1, the system 10 can include one or more data sources, one or more computing systems 300, one or more GNSS receivers 100, one or more sensors 200, and/or any suitable components.

Figure 2:
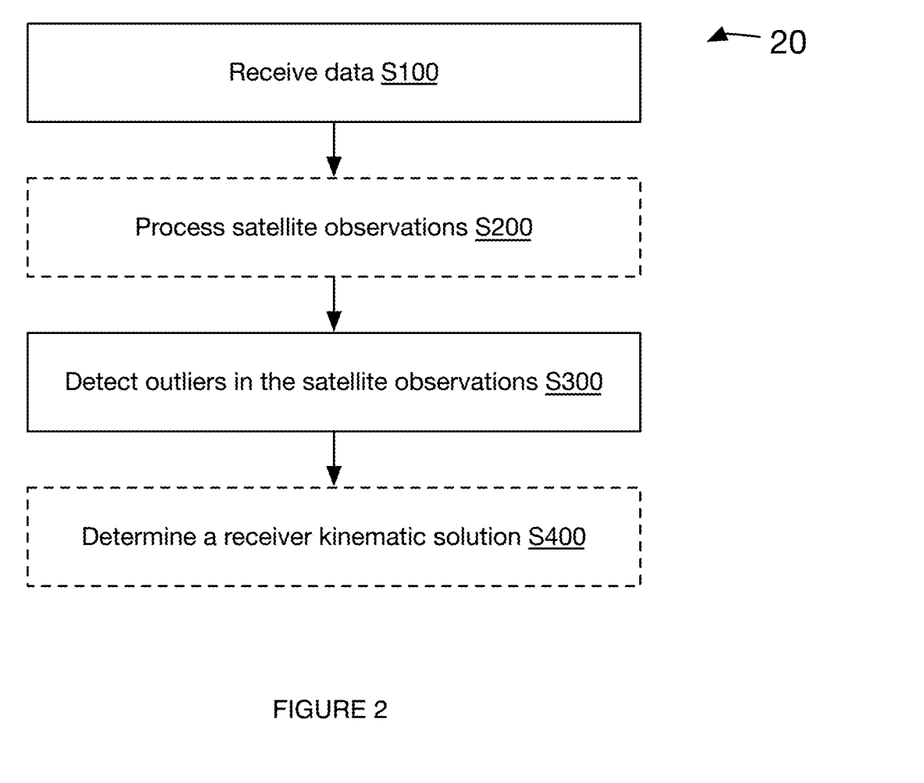
FIG. 2 is a schematic representation of the method.

As shown in FIG. 2, the method 20 can include receiving data S100, processing satellite observations S200, detecting outliers S300, determining a receiver position S400, and/or any suitable steps.

The system and method preferably function to determine a positioning solution of a rover such as with a high accuracy (e.g., cm-level, dm-level, m-level, etc.), high availability, high integrity, and/or other suitable property. The system and/or method can additionally function to detect (e.g., determine, identify, measure, etc.) outlier(s) in satellite observations to facilitate determination of a receiver kinematic solution with a high accuracy (e.g., cm-level, dm-level, m-level, etc.), availability, integrity, and/or other property and/or the system and/or method can otherwise function.

Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system, wherein the system can use the data for control and/or navigation.

2. Benefits

Variations of the technology can confer several benefits and/or advantages.

First, variants of the technology can enable improved positioning solution determination, particularly in (dense) urban environments. In urban environments, satellite observations can be contaminated, for instance with non-line-of-sight reception of signals or multipath effects, leading to inaccurate positioning determination using those signals. Examples of the technology can help decrease an impact of the contaminated signals by identifying outliers (and mitigating their impact).

Second, variants of the technology can enable a fusion engine (e.g., a fusion engine or filter to be updated, a fusion engine as disclosed in U.S. patent application Ser. No. 17/554,993 titled 'SYSTEM AND METHOD FOR FUSING DEAD RECKONING AND GNSS DATA STREAMS' filed 17 Dec. 2021 and incorporated in its entirety by this reference) with partial information. For instance, the inventors have discovered that using variants of the technology, the fusion engine (e.g., a filter thereof) can be updated when few (e.g., one, two, three, five, etc.) satellite signals (e.g., carrier phases) are available. In contrast, a positioning engine (e.g., GNSS engine) is generally not able to compute a fix when too few satellite observations (e.g., carrier phases) are available and therefore a fusion engine using only the output of a positioning engine generally receives less information than (and therefore can be less accurate and/or less available compared to) by using the technology.

However, variants of the technology can confer any other suitable benefits and/or advantages.

3. System

As shown in FIG. 1, the system can include one or more computing systems, one or more GNSS receivers, and/or one or more sensors. The system can function to determine kinematic properties of a receiver (e.g., position, velocity, acceleration, attitude, elevation, etc.), detect outliers in satellite observations, and/or can otherwise function.

The system preferably uses a set of data collected by one or more data sources (e.g., the system is in communication with one or more data sources). Data sources can include: receivers, sensors (e.g., located onboard the receiver, the external system, the reference stations, etc.), databases, satellites, reference stations, and/or any other suitable data source. Examples of data that can be used include: satellite observations, sensor observations, and/or any other suitable data.

The receiver preferably functions to receive a set of satellite observations (e.g., satellite signals such as carrier phase and satellite code) from one or more satellites. In variants (e.g., when the receiver includes a processor or other computing system), the receiver can determine the location of the receiver (and/or external system) based on the satellite observations (e.g., using a positioning engine). The receiver is preferably in communication with the computing system. However, the receiver can be integrated with the computing system, and/or the receiver and computing system can be arranged in any suitable manner. The receiver is preferably a stand-alone device (e.g., a GNSS receiver, antenna). However, the receiver can be integrated into an external system (e.g., be a component of an automobile, aero vehicle, nautical vehicle, mobile device, etc.), can be a user device (e.g., smart phone, laptop, cell phone, smart watch, etc.), and/or can be configured in any suitable manner. The receiver can be a single frequency receiver, dual-frequency receiver, triple frequency receiver, frequency agnostic receiver, and/or receiver any suitable number of satellite frequencies (e.g., for one or more satellite constellations).

The set of satellite observations can include orbital data, timestamp, range rate data, carrier phase data, pseudorange data, and/or any suitable data. The set of satellite observations can include and/or be associated with metadata (e.g., ephemeris data) and/or any suitable data or information. The set of satellite observations preferably includes satellite observations corresponding to satellites from a plurality of satellite constellations (e.g., Global Positioning System (GPS), GLObal Navigation Satellite System (GLONASS), BeiDou navigation satellite System (BDS), Galileo, Quasi-Zenith Satellite System (QZSS), etc.). However, the set of satellite observations can additionally or alternatively correspond to satellites from a single satellite constellation, can include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), GPS Aided Geo Augmented Navigation (GAGAN), Omnistar, StarFire, etc.; Ground Based Augmentation Systems (GBAS) such as Local Area Augmentation System (LAAS); etc.), and/or can include any suitable data.

In variants of the system including more than one receiver, each receiver can be configured to receive satellite observations corresponding to a satellite constellation, to a carrier frequency (e.g., the L1, L2, L5, E1, E5$a$, E5$b$, E5$ab$, E6, G1, G2, G3, B1, B2, B2$a$, B2$b$, B2$ab$, B3, LEX, etc. frequencies), and/or corresponding to any suitable source.

The reference station(s) preferably function to receive a set of satellite observations (e.g., reference station satellite observations) and transmit the reference station satellite observations to the computing system (and/or to the receiver). The satellite observations from the reference station(s) can be used to determine corrections (e.g., local and/or global corrections such as to account for atmospheric effects such as ionosphere delay, troposphere delay, ionosphere gradient, etc.; orbit errors; clock errors; hardware biases; antenna offsets such as phase center offset, phase center variation, etc.; ocean tides; pole tides; solid Earth tides; etc.) to the set of satellite observations measured (or otherwise received) by the receiver. Each reference station is preferably communicably coupled to the computing system. However, the reference station can include the computing system and/or be coupled to the computing system in any suitable manner. The reference stations can be in communication (e.g., via a direct communicable link, via an intermediary computing system, etc.) with the receiver. The reference station(s) are preferably located within about 500 km of the receivers, but the distance between the reference stations and the receiver can be any distance.

The reference station satellite observations can correspond to the same and/or a different set of satellites as the set of satellite observations received by the receiver. However, the reference station satellite observations can correspond to any suitable satellite observations.

The computing system preferably functions to process the data (e.g., satellite observations, sensor data, etc.) from the receiver, sensors, and/or other data sources. The computing system can: aggregate the data (e.g., combine the receiver satellite observations, reference station satellite observations, and sensor data; reorganize the receiver satellite observations, reference station satellite observations, and sensor data such as based on the time stamp, time of transmission, time of receipt; etc.), filter the data (e.g., to calculate state vectors, ambiguities such as phase ambiguities, etc. associated with the data), calculate the receiver position (e.g., based on ambiguities), correct the data (e.g., correct the satellite observations for orbit errors, clock errors, hardware biases, antenna offsets, atmospheric effects, ocean tides, pole tides, etc.), detect outliers (e.g., cycle slips, etc.), and/or can process the data in any suitable manner. The computing system can be local (e.g., on-board the external system, integrated in a receiver, integrated with a reference station, etc.), remote (e.g., cloud computing, server, networked, etc.), and/or distributed (e.g., between a remote and local computing system).

The computing system is preferably communicably coupled to the receiver, to the reference station, but the computing system can be in communication with any suitable components. In variants, the computing system can include one or more: communication module (e.g., functional to receive and/or transmit data or information between endpoints), fusion engine (e.g., functional to determine a positioning solution based on satellite observations, a satellite positioning solution, sensor data, satellite corrections, etc.; error compensator such as an error estimator, Kalman filter, extended Kalman filter, unscented Kalman filter, particle filter, etc.; mechanization module; etc.), positioning engine (e.g., functional to determine, calculate, estimate, etc. a positioning solution using satellite signals and optionally satellite corrections), observation monitor (e.g., functional to monitor, check, detect, etc. potential faults in satellite signals, sensor data, etc.), carrier phase processing module (e.g., functional to process satellite carrier phase such as to determine single, double, triple, etc. difference carrier phases; compose satellite observations; filter satellite observations; select, identify, determine, etc. reference satellite (s); etc.), differencing module (e.g., functional to determine differenced carrier phase data), data filter (e.g., functional to identify, modify, remove, reduce, etc. a set of satellite observations), error estimator (e.g., filter), outlier detection module (e.g., functional to detect outliers in satellite signals, carrier phase data, sensor data, etc.), and/or any suitable modules or components. In some variants, a fusion engine can include a buffer, a carrier phase module (e.g., a time difference of carrier phase module, a differencing module, a carrier phase processing module, etc.), an outlier detector, an outlier mitigator, an error compensator, a mechanization module, a sensor module (e.g., configured to apply error corrections to sensor readings, configured to determine kinematics from sensor readings, etc.), a fusion filter, a GNSS solver (e.g., GNSS filter, positioning engine solver, etc.), and/or any suitable components. However, the elements and/or modules can be integrated in a positioning engine, be separate components, and/or can be integrated in any manner.

Figure 5:
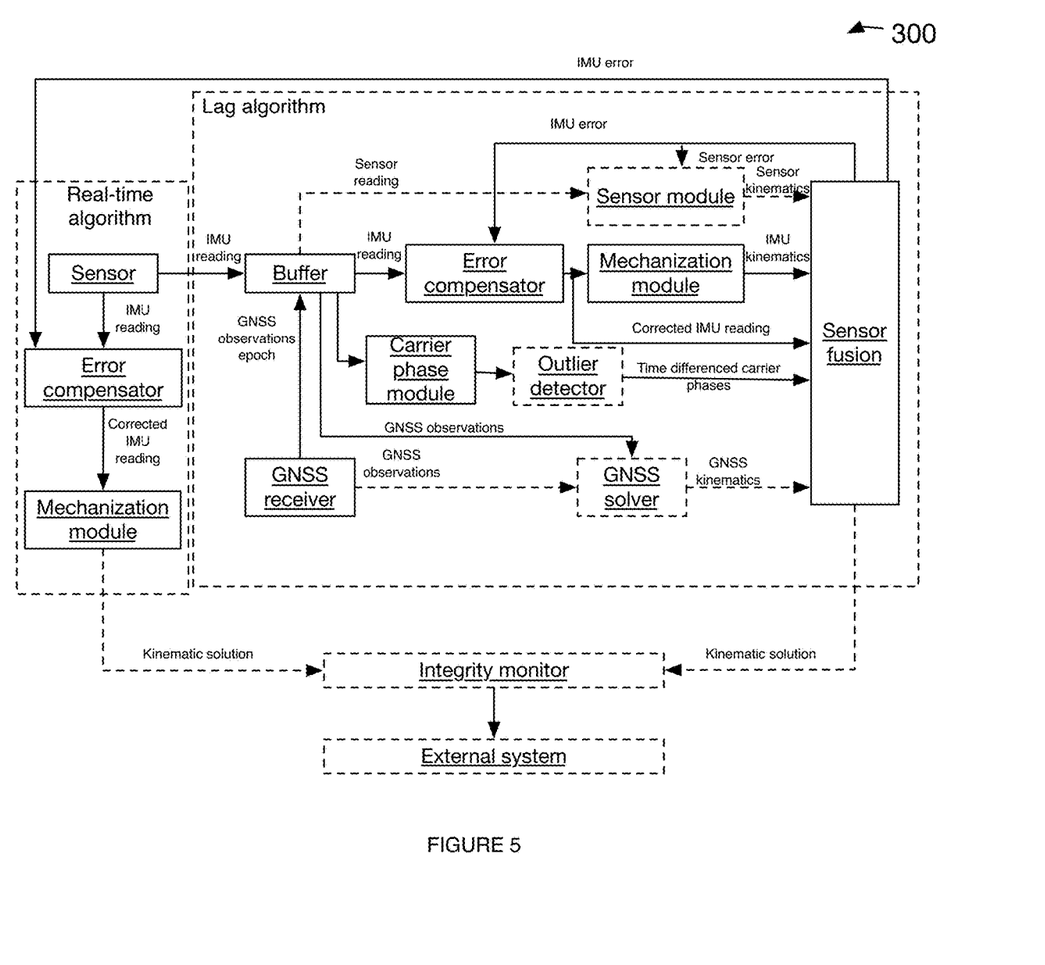
FIG. 5 is a schematic representation of an example of data flow within a fusion engine.
Figure 6:
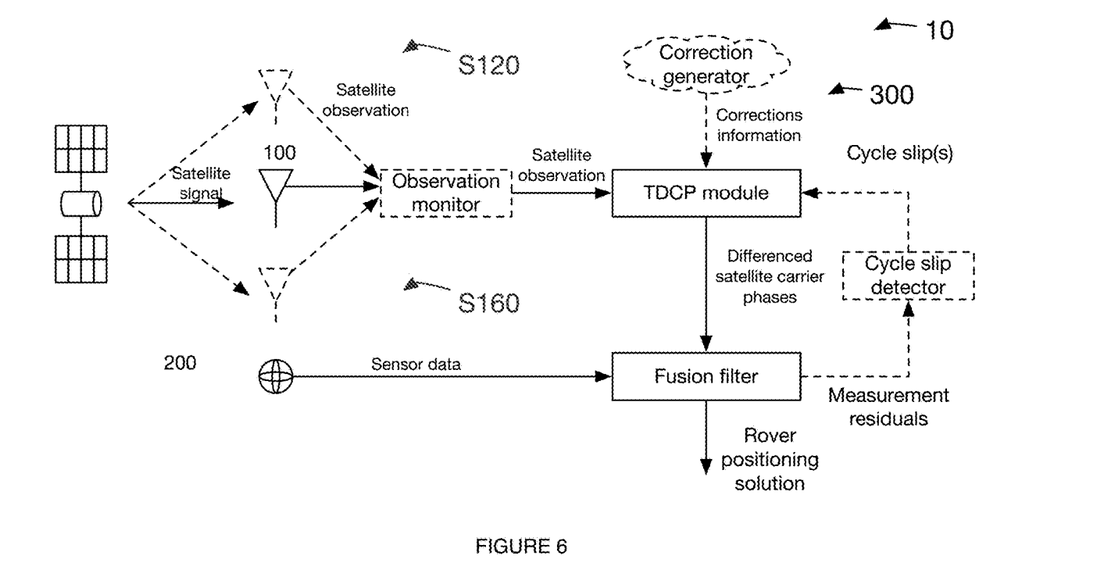
FIG. 6 is a schematic representation of an example of data flow between components.

As shown for example in FIG. 5, the fusion engine can include (e.g., operate between) a real-time algorithm (e.g., that processes sensor data at approximately the same time and/or rate as it is received) and a lagging algorithm (e.g., that processes sensor data at approximately the same time, rate, etc. as satellite observations are received). However, the fusion engine can operate in any manner (e.g., as disclosed in U.S. patent application Ser. No. 17/554,993 titled 'SYSTEM AND METHOD FOR FUSING DEAD RECKONING AND GNSS DATA STREAMS' filed 17 Dec.

2021 which us incorporated in its entirety by this reference). The sensor fusion engine can be tightly coupled (e.g., tightly couple satellite signals and sensor data such as by processing raw satellite observations and the sensor data), loosely coupled (e.g., loosely couple satellite signals and sensor data such as by receiving, processing, etc. a GNSS-derived positioning solution with the sensor data), semi-tightly coupled (e.g., semi-tightly couple satellite signals and sensor data such as by receiving, processing, etc. a GNSS-derived position solution from a positioning engine in addition to raw satellite observations with the sensor data; processed satellite signals such as differenced satellite signals with sensor data; etc.), and/or can otherwise couple or isolate sensor data and satellite data.

4. Method

As shown in FIG. 2, the method can include receiving data S100, processing satellite observations S200, detecting outliers S300, determining a positioning solution S400, and/or any suitable steps.

The method preferably functions to determine (e.g., calculate, determine, compute, estimate, predict, etc.) a positioning solution (e.g., rover kinematic solution, receiver kinematic solution, etc.). The method can additionally or alternatively detect outliers in satellite observations and/or otherwise function. Steps and/or substeps of the method can be performed iteratively (e.g., for different epochs, for the same epoch, etc.), sequentially (e.g., for different external systems), and/or in any suitable order. The steps and/or substeps of the method can be performed in series and/or in parallel. The steps and/or substeps are preferably performed by a system (e.g., as described above), but can be performed by any system.

Receiving the data S100 functions to measure and/or detect a set of data that can be used to determine a positioning solution. The data can include sensor data (e.g., sensor readings, sensor measurements, etc.), satellite signals (e.g., satellite observations, set of satellite observations, etc.), reference station signals (e.g., satellite observations measured at one or more reference station, base station, etc.), satellite corrections (e.g., satellite integrity information; satellite-specific corrections; spatially invariant corrections such as antenna phase center, satellite orbit, satellite clock, satellite bias, receiver clock, receiver bias, etc.; spatially variant corrections such as atmospheric corrections, ionospheric corrections, tropospheric corrections, etc.; etc.), and/or any suitable information. The data can be received from a data source (e.g., satellite signals emitted by one or more satellites can be detected at an antenna, sensor data can be received from a sensor, etc.), from a database (e.g., historic data measurements, stored data measurements, etc.), and/or the data can otherwise be received. The data is typically received by a computing system but can additionally or alternatively be received by any suitable component. S100 can include receiving satellite signals S120, receiving sensor data S160, and/or any suitable steps.

In variants including S120, each satellite signal can be associated with a satellite, at a reference station, a receiver, and/or at any suitable endpoint. The satellite signals (e.g., satellite observations) can include satellite pseudorange, carrier phase, orbital data, timestamp, range rate data, and/or any suitable data. The satellite observations can be stored (e.g., temporarily stored such as in short-term memory, cache, etc.). Satellite observations are preferably received from a plurality of satellite constellations (e.g., two constellations, three constellations, four constellations, etc.), but can be received from a single satellite constellation. In a specific example, the satellite observations can include only carrier phase observations from one or more satellites (e.g., 1 or more satellites for single differencing, 2 or more satellites for double differencing, 3, 4, 5, 6, 7, 8, 10, 20, 30, 50 satellites, etc.). The satellite observations can include signals from one or more satellite frequencies. However, the satellite observations can include any suitable measurements.

Receiving sensor data S160 functions to receive data from one or more sensors. In variants, the sensor data can be acquired from a plurality of sensors (e.g., redundant sensors, different sensor types, common sensor types, etc. such as 2 sensors, 3 sensors, 4 sensors, 5 sensors, 10 sensors, etc.). The sensor data is preferably received (e.g., acquired) at a sensor acquisition frequency. The sensor data is preferably associated with a timestamp. The timestamp is preferably the time the data was acquired but can be the time of receipt (e.g., by the computing system), the time of processing, and/or be any suitable time. In a first illustrative example, receiving sensor data can include receiving acceleration and/or rotation data from an accelerometer and/or gyroscope. In a variation of the first illustrative example, the sensor data can include a first and second IMU data set acquired using a first and second IMU sensor (e.g., accelerometer, gyroscope, magnetometer, etc.). In a second illustrative example, receiving sensor data can include acquiring one or more images, where the images can be processed (e.g., using artificial intelligence, manually, using image processing algorithms, using stereoimage algorithms, monocular vision algorithms, etc.). In a third illustrative example, receiving sensor data can include measuring or receiving wheel tick (or other odometry or distance measuring instrument) and/or steering angle data. In a fourth illustrative example, any or all of the preceding three examples can be combined. However, any suitable sensor data can be received.

S120 and S160 can be performed concurrently (e.g., simultaneously, contemporaneously, etc.), S120 can be performed before S160, S160 can be performed before S120, and/or S120 and S160 can be performed with any timing. Typically, but not always, S160 will be performed multiple times while S120 is being performed (e.g., several sets of sensor data each associated with a different timestamp will be acquired while a single set of satellite observations is acquired). S120 and S160 can be performed synchronously or asynchronously.

S100 can include monitoring the data (particularly, but not exclusively the satellite signals and/or correction information) for potential feared events, for example by using an observation module. The observation module is preferably configured to detect high dynamic predetermined events, but may be configured to detect datalink predetermined events, low dynamic predetermined events, and/or any predetermined events. Potential predetermined events may include any detected issues with observations—observations changing too rapidly, or exceeding thresholds, for example.

Processing the satellite observations S200 can function to format, analyze, convert, modify, preprocess, and/or otherwise prepare or interpret the satellite observations. The satellite observations can be processed at a rover (e.g., computing system thereof, processing engine, time difference of carrier phase module thereof, carrier phase module thereof, etc.), at a remote computing system (e.g., a processing engine, carrier phase module, time difference of carrier phase module, etc. thereof), and/or by or at any suitable component(s).

Figure 3:
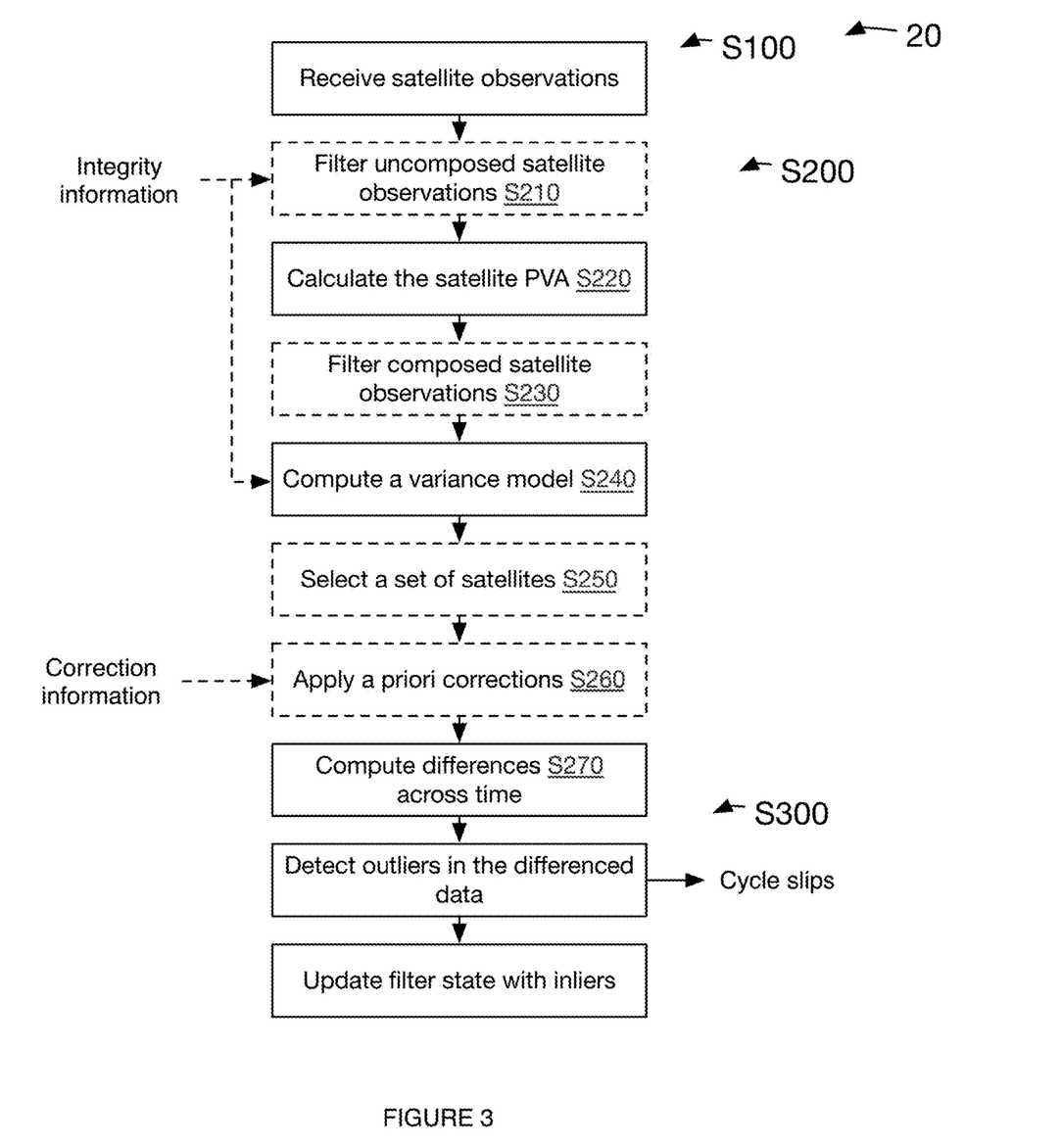
FIG. 3 is a schematic representation of an example of determining a positioning solution using single differencing.

As shown for example in FIG. 3, processing the satellite observations can include: refining the satellite observations S210, determining a satellite solution S220 (e.g., a satellite position, velocity, attitude, etc.), refining the satellite solution S230 (e.g., correcting a satellite position, velocity, attitude, etc.), determining a variance model S240, selecting satellite observations S250, correcting the satellite observations S260, differencing the satellite observations S270, and/or any suitable step(s) or processes.

Refining the satellite observations S210 (sometimes referred to as filtering the satellite observations, filtering the uncomposed satellite observations, etc.) preferably functions to identify a subset of satellite observations from the set of satellite observations. Refining the satellite observations is particularly beneficial when there is a processor limitation (e.g., power, bandwidth, speed, memory, power draw, etc.) such that not all satellite observations can be processed. However, refining the satellite observations can additionally or alternatively be beneficial for aiding in achieving a high quality (e.g., accurate, reliable, available, high integrity, etc.) receiver kinematic solution and/or can otherwise be beneficial. The subset of satellite observations preferably includes satellite observations with a high quality (e.g., satellite observations that meet one or more criterion for further processing; satellite observations that are suitable for determining a receiver location with a target accuracy, reliability, integrity, etc.; low noise satellite observations; etc.). However, low quality satellite observations can be included and/or satellite observations with any suitable quality can be used. Exemplary criteria for inclusion (or used to exclude satellite observations that do not achieve these targets) include: carrier to noise density (C/No) (e.g., signal to noise ratio; when a satellite observation C/No is less than a threshold, the observation can be excluded from the subset; when a satellite observation has at least a threshold C/No, the satellite observation can be included in the subset; etc.), lock-time (e.g., when a satellite lock-time is at least a threshold time, satellite observations received from said satellite can be included in the subset; when a satellite lock-time is less than a threshold time, satellite observations received from said satellite can be excluded from the subset; etc.), half cycle flag (e.g., when a half-cycle flag inconsistency between observations from the same satellite is detected, associated satellite observations can be excluded from the subset; when a half-cycle flag consistency between observations from the same satellite is detected, associated satellite observations can be included in the subset; when a half-cycle flag consistency between observations from the same satellite is unknown, associated satellite observations can be included in or excluded from the subset; etc.), integrity information (e.g., satellite integrity monitoring such as using RAIM, ARAIM, ERAIM, systems or methods as disclosed in U.S. patent application Ser. No. 17/343,327 titled 'SYSTEM AND METHOD FOR SATELLITE POSITIONING' filed 9 Jun. 2021 which is incorporated in its entirety by this reference, etc.; integrity information as disclosed in U.S. patent application Ser. No. 17/022,924 titled 'SYSTEMS AND METHODS FOR HIGH-INTEGRITY SATELLITE POSITIONING' filed 16 Sep. 2020 which is incorporated in its entirety by this reference; where satellite observations associated with high integrity satellites at a given time can be included in the subset; where satellite observations associated with low integrity satellites at a given time can be excluded from the subset; etc.), and/or any suitable criteria can be used to include or exclude satellite observations from the subset of satellite observations.

The refinement criteria (e.g., number of criteria assessed, which criteria are assessed, criteria thresholds, etc.) can depend on availability of the information (e.g., whether or not integrity information is available), processor capabilities (e.g., power, bandwidth, memory, etc.), target receiver kinematic solution properties (e.g., target accuracy, reliability, repeatability, reproducibility, etc.), number of satellites to be represented in the subset of satellite observations, number of satellite constellations to be represented in the subset of satellite observations, and/or one any suitable properties or information.

In some variants, S210 can include ranking (e.g., ordering) the satellite observations based on the one or more refinement criteria, where the subset of satellite observations can include the top n satellite observations (e.g., where n is an integer number that can be any integer between 1 and N where N is the total number of satellites in view of the receiver). In related variations, the subset of satellite observations can include all satellite observations that pass the one or more refinement criteria. However, any suitable satellite observations can be included in the subset of satellite observations.

Determining a satellite solution functions to determine (e.g., calculate, estimate, identify, etc.) a satellite solution (e.g., satellite position $P_s$, satellite velocity $V_s$, satellite acceleration $A_s$, combinations thereof such as PVA, satellite orbit, satellite clock, etc.) associated with each satellite observation (e.g., of the subset of satellite observations). The satellite solution and associated satellite observation(s) (e.g., satellite observation(s) detected from the satellite) preferably form a composed satellite observation (e.g., forming a set of composed satellite observations from the subset of satellite observations as determined in S210). However, a composed satellite observation can otherwise be defined. The satellite solution can be determined, for example, using a positioning engine, using a mechanization module, using a geometric model, and/or can otherwise be determined. For example, the satellite solution (e.g., satellite coordinates) can be calculated from the satellite ephemeris data. As another example, a clock (e.g., satellite clock) parameter can be determined using IGS model, IGU-P model, RES-P5 model, a hybrid model, and/or using any suitable model(s).

Refining the satellite solutions S230 (refining the composed satellite observations, refining the subset of satellite observations, filtering the subset of satellite observations, etc.) functions to determine (e.g., identify, select, etc.) a subset of composed satellite observations from the set of composed satellite observations. Refining the satellite solutions preferably includes refining the composed satellite observations, but can refine any suitable data. Refining the composed satellite observations can be performed in the same manner as refining the satellite observations and/or can be performed in a different manner (e.g., include additional or alternative criteria such nonholonomic constraints, use different criteria, etc.). For instance (in addition to or in the alternate to S210), refinement criteria for the composed satellite observations can include: satellite orbit thresholds, satellite clock thresholds, satellite ephemeris cutoffs (e.g., satellites where the ephemeris cuts over between epochs can be excluded), satellite elevation thresholds (e.g., satellite observations associated with a satellite with an elevation greater than a threshold elevation angle can be included in the subset of satellite observations; satellite observations associated with a satellite with an elevation less than a threshold elevation angle can be excluded from or removed from the subset of satellite observations; etc.), satellite attitude thresholds, satellite geometry (e.g., satellites experiencing, or anticipated to experience in a subsequent epoch, multipath can be excluded), satellite motion (e.g., a satellite that undergoes an unexpected jump in position between epochs, between observations from the same satellite, etc. can be excluded), availability of prior (or current) observations (e.g., satellites that do not include an observation from a prior epoch can be excluded), and/or any suitable refinement (e.g., exclusion or inclusion criterion) can be used.

Determining a variance model 400 functions to determine a bound (e.g., an upper bound, accurate bound, lower bound, etc.) on error sources that can be present in the satellite observations (e.g., functions to determined a measurement noise covariance). The bound is preferably an overbound of the actual error introduced by potential error sources. However, the variance model can form an underbound of the actual error. The variance model can be an adaptive model (e.g., to adapt to changes in satellites, satellite integrity, receiver location, satellite lock-time, satellite elevation above the horizon, etc.), a self-tuning model, a non-adaptive (e.g., fixed model), and/or can include any suitable model. The variance model (e.g., measurement noise covariance, measurement noise covariance matrix, etc.) can depend on (e.g., be derived from, determined from, etc.) lock-time, satellite elevation, signal frequency(s), satellite constellation (s), integrity information (e.g., bound information, integrity flags, residual correction, correction error, etc.), and/or on any suitable information (e.g., information relating to satellites associated with satellite observations in the refined set of composed satellite observations, set of composed satellite observations, subset of satellite observations, set of satellite observations, etc.).

Exemplary error sources that the variance model can account for include: thermal measurement noise, orbit error (e.g., change in orbit error projected on a line-of-sight vector), residual satellite clock error (e.g., over a time interval between satellite observations), troposphere delays (e.g., remaining troposphere effects after a priori model corrections applied), ionosphere delays (e.g., remaining ionosphere effects after a priori model corrections are applied, depending on a satellite elevation, etc.), multipath effects, inter-constellation clock drift, and/or any suitable error sources. In some variants, the variance model can not account for cycle slips (e.g., as cycle slips can be accounted for, corrected for, identified, etc. during outlier detection). However, additionally or alternatively, the variance model can account for cycle slips.

Selecting satellites S250 can function to reduce a processing bandwidth used during the method (e.g., by reducing the number of satellite observations processed). Selecting satellite observations can be performed in the same manner as refining the satellite observations (and/or composed satellite observations) and/or in a different manner. The selected satellite observations are preferably the highest quality satellite observations (e.g., satellite observations associated with the highest quality satellites in a given situation), but can include any suitable satellite observations. The satellites can be selected based on the variance model, the satellite geometry, lock-time, integrity, signal to noise ratio, $C/N_o$, previously selected satellites (e.g., a set of satellites associated with a prior epoch), whether the satellite has previously been identified as an outlier (e.g., for a prior epoch, for a current epoch, etc.), and/or based on any suitable information. At least four satellite observations are preferably selected (e.g., to enable an accurate, full observability, etc. GNSS solution to be computed). However, one, two, or three satellite observations can be selected (e.g., to be used to update a fusion engine).

In a specific example, selecting the satellite observations can include ordering (e.g., ranking, sorting, etc.) the satellites (and/or associated satellite observations) based on a quality (e.g., variance model, the satellite geometry, lock-time, integrity, signal to noise ratio, $C/N_o$, etc.) and selecting a threshold number of satellite observations (e.g., the top, first, etc. N satellite observations, where N is an integer that can depend on a processor bandwidth, number of in-view satellites, target receiver kinematic solution property, etc.).

In some variants (as shown for example in FIG. 4), selecting the satellites S250 can include selecting a reference satellite S255. The reference satellite can be used for computing an intersatellite difference. However, the reference satellite can otherwise be used. A reference satellite can be selected for each satellite constellation, for the set of satellite observations (e.g., refined set of composed satellite observations, set of composed satellite observations, subset of satellite observations, set of satellite observations, etc.), for a subset of satellites (e.g., where differences or combinations are only computed for a subset of the refined set of composed satellite observations), and/or for any suitable satellite grouping. The reference satellite can be the highest quality satellite (e.g., highest signal to noise ratio, highest C/No, longest lock time, highest integrity, lowest integrity risk, longest time since a fault, shortest time since a fault, associated with the lowest unaccounted-for errors in the variance model, highest elevation, least interference, etc.), randomly or pseudorandomly selected (e.g., from the selected satellite observations), manually selected (e.g., by a user, operator, etc.), selected based on satellite geometry (e.g., closest to directly overhead, closest to a mean position of in-view satellites, etc.), a previous reference satellite (e.g., reference satellite selected for a prior epoch), and/or can be selected in any manner. For example, a highest elevation satellite can be used as the reference satellite. In this example, the same reference satellite can be used for satellites associated with different satellite constellations (e.g., when an inter-constellation clock offset is stable), which can reduce a total number of satellites needed for updating a fusion engine (e.g., because each constellation does not need at least two satellites). However, any suitable reference satellite(s) can be chosen.

In some instances, S250 and/or S255 may be repeated. For example, when an outlier is detected (e.g., a probability that a satellite observation associated with the satellite is an outlier is greater than a threshold probability such as 90%, 95%, 99%, 99.5%, 99.9%, 99.95%, 99.99%, 99.995%, 99.999%, etc.) in a satellite (e.g., a reference satellite), the set of selected satellites can be updated to exclude the outlier(s), a new reference satellite can be selected (e.g., from the set of satellites excluding the outlier reference satellite), and/or the selected satellite can otherwise be modified.

Correcting the satellite observations S260 functions to use a priori corrections to reduce or remove one or more error sources from the satellite observations. The a-priori corrections can correct for (e.g., remove, reduce, etc.) hardware bias errors, clock errors (e.g., receiver clock, satellite clock, etc.), orbit errors, atmospheric effects (e.g., ionospheric delay, tropospheric delay, ionosphere gradient, etc.), and/or can correct for any suitable error sources. The corrections can include OSR corrections, SSR corrections, RTK corrections, and/or any suitable corrections. The corrections can be determined using a corrections generator, a positioning engine (e.g., a PVT engine), a modelling engine, and/or using any suitable component. For example, an atmospheric (e.g., tropospheric) correction can be determined using any of global zenith tropospheric delay model (GZTD), Satellite-based Augmentation System (SBAS), UNB3 model, UNB3m models, and/or any suitable model(s). As another example, a clock (e.g., satellite clock) correction can be determined using IGS model, IGU-P model, RES-P5 model, a hybrid model, and/or using any suitable model(s). However, the corrections can be determined in any manner.

In a specific example, the corrections can be determined as disclosed in (e.g., be provided by a corrections generator such as a cloud-based, distributed, etc. corrections generator) U.S. patent application Ser. No. 17/347,874 titled 'SYSTEMS AND METHODS FOR DISTRIBUTED DENSE NETWORK PROCESSING OF SATELLITE POSITIONING DATA' filed 15 Jun. 2021, U.S. patent application Ser. No. 17/554,397 titled 'SYSTEM AND METHOD FOR GAUSSIAN PROCESS ENHANCED GNSS CORRECTIONS GENERATION' filed 17 Dec. 2021, and/or U.S. patent application Ser. No. 18/079,640 titled ''SYSTEM AND METHOD FOR CORRECTING SATELLITE OBSERVATIONS' filed 12 Dec. 2022, each of which is incorporated in its entirety by this reference, and/or can be determined in any manner.

In some variants, correcting the satellite observations can correct for rapidly changing corrections (e.g., satellite clock errors) and can not correct for slowly changing corrections (e.g., tropospheric corrections). However, any suitable corrections can be used.

Differencing the satellite observations S260 functions to reduce and/or remove one or more error source from the satellite observations. The satellite observations can be the selected satellite observations, the refined satellite observations, the refined composed satellite observations, the composed satellite observations, and/or any suitable satellite observations (e.g., raw satellite observations). The satellite observations can be single differenced, double differenced, triple differenced, and/or be differenced and/or combined (such as to form wide-lane combinations, narrow-lane combinations, Melbourne-Wübbena combination, Hatch-Melbourne-Wübbena, geometry-free combination, atmosphere-free combination, etc.) in any manner.

Differencing the satellite observations preferably includes determining a time difference for each satellite observation relative to a reference epoch. The time differencing can be beneficial, for instance, for removing an integer ambiguity from the carrier phase. For instance, a differenced satellite observation for satellite k can be a difference between satellite observations for satellite k at time t and satellite observations for satellite k at the reference time ($t_{ref}$) such as $\nabla l_t^k = l_t^k - l_{t_{ref}}^k$. The reference epoch can be the first observation epoch, the first observation epoch for a satellite, the first observation epoch with a threshold number of satellites (of a given quality) for a satellite constellation, a prior epoch (e.g., immediately prior epoch, prior epoch during performance of the method, an epoch within a previous threshold time, etc.), and/or any suitable epoch. The reference epoch can be the same or different for each satellite observation. The reference epoch can be static or variable. The reference epoch can be updated for each new epoch (e.g., new satellite observations), after a threshold number of epochs (e.g., 2, 3, 5, 10, 20, values therebetween, etc. epochs; a number that depends on an application; etc.), at predetermined times (e.g., 1 sec, 5 sec, 10 sec, 30 sec, 1 min, 5 min, 10 Min, 20 min, 30 min, 1 hour, values or ranges therebetween, >1 hour, etc.), at a predetermined frequency, and/or with any suitable timing or responsive to any suitable trigger. Updating the reference epoch rarely (e.g., after a predetermined number of epochs have passed, after a threshold time, etc.) may be beneficial for applications where a displacement or pass-to-pass accuracy is important (e.g., agricultural, lawnmowing, robotic, etc. applications where a displacement relative to a recent or prior position can be more important than an absolute position). In variants where the reference epoch is updated rarely, the frequency and/or time between updates can depend on a lane length, a target lane overlap (e.g., maximum acceptable lane overlap), a total number of lanes, and/or can depend on any suitable aspect of the lanes.

For example, for each new epoch, the prior epoch can be used as a reference epoch for each satellite observation (e.g., each epoch can be referenced to an immediately prior epoch). In another example, a reference epoch can be a fifth (or other value such as second, third, fourth, sixth, tenth, twentieth, thirtieth, fiftieth, one hundredth, etc.) prior epoch before the current epoch. When the reference epoch is updated, the updated reference epoch is preferably within a threshold time of the current time (e.g., 5 s, 10 s, 20 s, 30 s, 45 s, 60 s, 90 s, 120 s, 150 s, 180 s, 300 s, etc.; a time that depends on a displacement accuracy; a time that depends on the use case; etc.). However, any suitable reference epoch can be used.

In some variants, differencing the satellite observations can include computing differenced satellite observations between a satellite and reference satellite. In these variants, the differenced satellite observations are preferably double differenced (e.g., with respect to time and with respect to the reference satellite). However, the differenced satellite observations can additionally or alternatively include frequency differencing, differencing with reference stations, and/or any suitable difference(s). Each satellite is preferably referenced with either the same reference satellite or the same reference satellite for its associated satellite constellation. However, different satellites can be associated with different reference satellites. Performing the double differencing can be beneficial for reducing the number of states that need to be modelled or corrected for (e.g., because the double difference can remove one or more error sources such as receiver clock errors). The difference with respect to the reference satellite can be calculated before the time difference, after the time difference, and/or simultaneously with the time difference.

Detecting outliers in the satellite observations S300 preferably functions to determine whether one or more satellite observations of the set of satellite observations is an outlier. Each satellite observation (e.g., differenced satellite observation, composed satellite observation, refined composed satellite observation, refined satellite observations, etc.) can be a candidate outlier, a subset of the satellite observations can be candidate outliers, and/or any suitable satellite observations can be candidate outliers. The outliers are preferably determined in observation space (e.g., as a differenced satellite observation, as a satellite observation, as shown for example in FIG. 5, etc.). For instance, the outliers can be detected without (e.g., before) updating a filter state by detecting outliers in the differenced carrier phases. Performing outlier detection in the observation space can be beneficial, for instance, as it can produce more reasonable bounds (e.g., not overly restrictive bounds) on whether a measurement is an outlier (which can improve an availability of the resulting receiver kinematic solution as more measurements can be retained and used in the receiver kinematic solution determination). However, the outliers can be determined (e.g., analyzed) in position space (e.g., converting the satellite observations into receiver or satellite kinematic solutions) and/or in any suitable space.

Outliers are preferably detected based on an innovation (e.g., a difference between a current observation and a predicted observation such as predicted based on a previous filter state, filter statistics, variance model, etc.), but can additionally or alternatively be detected based on the raw satellite observations, the processed satellite observations, measurement residuals, and/or based on any suitable information. As an illustrative example, an innovation for satellite k can be determined from the time differenced carrier phase for satellite k (between the current epoch and the reference epoch) and an estimated time difference carrier phase determined by projecting a difference between a current kinematic solution and a prior kinematic solution (e.g., where both the current and the prior kinematic solutions are states of a filter) onto a line-of-sight to the satellite (to convert the previous filter state to observation space). The innovation is preferably normalized, but can be unnormalized. The innovation is preferably normalized using a predicted covariance (e.g., which can depend on a filter state vector, measurement, etc.). However, the innovation can otherwise be normalized.

Determining whether a satellite observation (e.g., a differenced carrier phase) is an outlier can include performing a $X^2$-test, a Student's t-test, an F-distribution test, a Bayesian test, likelihood ratio test, a portmanteau test, a binomial test, a Yates test, and/or any suitable test can be performed. In an illustrative example, the innovation (e.g., normalized innovation) can be predicted to be distributed according to a distribution (e.g., a $X^2$ distribution/law). In a second illustrative example, the outliers can be detected based on a normalized innovation squared statistic. The test metric can be related to a threshold rejection percentage for inlier rejection (e.g., falsely reject inliers at most a threshold percent of time such as 0.01%, 0.1%, 1%, 10%, etc.), a threshold rejection for outlier rejection (e.g., falsely retain outliers at most a threshold percent of time such as 0.01%, 0.1%, 1%, 10%, etc.), $X^2$ goodness of fit metric, $X^2$ test of independence, a number of degrees of freedom (e.g., which can depend on a number of independent satellite observations in the set, a number of differenced satellites in the set, etc.), and/or any suitable test metric can be used. When the $X^2$ value exceeds the test metric value (for instance, for a single degree of freedom and a probability of falsely rejecting an inlier of 0.1%, the test metric value can be about 10.828), the satellite observation(s) can be identified as an outlier. When the $X^2$ value is at most equal to the test metric value, the satellite observation(s) can be identified as inliers. In some specific examples, outliers can be detected in a manner as described in U.S. patent application Ser. No. 16/748,517 titled 'SYSTEMS AND METHODS FOR REDUCED-OUTLIER SATELLITE POSITIONING' filed 21Jan. 2020 and/or in U.S. patent application Ser. No. 18/116,117 titled 'SYSTEM AND METHOD FOR DETECTING OUTLIERS IN GNSS OBSERVATIONS' filed 01Mar. 2023, each of which is incorporated in its entirety by this reference. However, satellite observation(s) can otherwise be identified as an inlier or an outlier.

In some variants, detecting outliers can include identifying a cycle slip has occurred in a satellite observation. For example, when the innovation is close to an integer value of wavelengths (e.g., within about ±0.01, about ±0.05, about ±0.1, etc. of an integer), the outlier can be identified as a cycle slip (associated with the integer value). Similarly, a polarity of the satellite observation (e.g., a half cycle) can be identified when the innovation is close to 0.5 (e.g., within about ±0.01, about ±0.05, about ±0.1, etc.) or an odd multiple thereof (e.g., when the innovation is close to (2k+1)*0.5 where k is an integer). Identifying a cycle slip can be beneficial for determining (e.g., fixing) a carrier phase ambiguity (e.g., in S500).

S300 can include mitigating the effect of outlier(s) S350 which can function to decrease the effect of outliers. All outliers (e.g., outliers detected in S300) can be mitigated, a subset of outliers can be mitigated (e.g., a most egregious outlier can be mitigated and then satellite observations can be reevaluated for whether they are outliers; a reference satellite outlier can be mitigated without mitigating outliers for satellites referenced to the reference satellite, with further analyzing the other satellite observations, etc.; etc.), and/or any suitable outliers can be mitigated.

Mitigating the effect of outliers can include: removing one or more satellite observations from the set of satellite observations, applying a weight factor to one or more satellite observations (e.g., apply a smaller weight factor to outliers, apply a larger weight factor to inliers, apply a weight factor that depends on a $X^2$ value of the satellite observation, etc.), acquiring additional satellite observations, choosing a new reference satellite and transforming the satellite observations according to the new reference satellite, selecting a new set of satellites, repairing a cycle slip, including synthetic observations with negative covariances (e.g., such as to cancel the outlier observations when processed by a filter), and/or any suitable mitigation steps. Mitigating the effect of outliers can be followed by determining whether any remaining satellite observations are outliers (e.g., performing S300 on the outlier reduced set of satellite observations), by determining the GNSS receiver position S400, processing the satellite observations, and/or by any suitable step.

In variants, mitigating the effect of outliers can include updating one or more reference satellites. For instance, a number of outliers exceeding a threshold number of outliers can be indicative of the reference satellite being the outlier. In these variants, the reference satellite (e.g., reference satellite, reference satellite for a satellite constellation associated with a threshold number of outliers, each reference satellite, etc.) can be replaced. All reference satellites can be updated, reference satellites associated with a satellite constellation with greater than a threshold number of outliers (e.g., a number that depends on a number of satellites in view, a number of satellites in the set of selected satellites, a number of satellites in a set of refined satellite observations, etc. such as 2 outliers, 3 outliers, 5 outliers, 10 outliers, etc.), and/or any suitable reference satellites can be updated. For example, a second-best satellite (e.g., according to one or more selection quality), random satellite, and/or any suitable satellite(s) can be selected. After new reference satellites are determined, the differences are preferably calculated (e.g., S260) and outlier detection (e.g., S300) are preferably performed. However, additionally or alternatively, the reference satellite can be removed from the satellite observations (e.g., identified as an outlier without performing an independent test on the reference satellite, without further testing the remaining satellites for outliers, etc.), the reference satellite observations can be mitigated in a manner as described above, and/or any suitable actions or response can be performed.

Determining the receiver kinematic solution S400 functions to determine the GNSS receiver position (and/or displacement, velocity, etc.) to high accuracy (e.g., receiver position is known to within 1 mm, 2 mm, 5 mm, 1 cm, 2 cm, 5 cm, 1 dm, 2 dm, 5 dm, 1 m, 2 m, 5 m, 10 m, etc.). The receiver kinematic solution (e.g., receiver PVA solution, receiver positioning solution, rover PVA solution, rover positioning solution, etc.) is preferably determined by the receiver (e.g., a computing system thereof, a positioning engine thereof, a fusion engine thereof, etc.), but can be determined by a remote computing system (e.g., cloud computing positioning engine, cloud computing fusion engine, etc.), and/or any component. The receiver kinematic solution can be determined using the outlier-mitigated satellite observations, sensor data (e.g., IMU data, DMI data, wheel tick information, etc. such as using a fusion engine), and/or using any suitable satellite observations or data. The receiver kinematic solution can include a position, velocity, acceleration, jerk, jounce, displacement, attitude, and/or any suitable information.

Determining the receiver kinematic solution can include: determining a carrier phase ambiguity (e.g., a float carrier phase ambiguity, an integer carrier phase ambiguity, etc.), calculating the receiver kinematic solution based on the carrier phase ambiguity, determining a baseline vector between a receiver and a reference station, determining an absolute receiver kinematic solution (e.g., by applying the baseline vector to the reference station location), determining the receiver kinematic solution using dead reckoning, and/or any steps. The receiver position can be determined using an estimator and/or any suitable method. Exemplary estimators include: Kalman filters (e.g., unscented Kalman filters, extended Kalman filters, recursive Kalman filters, etc.), particle filters (e.g., monte carlo simulators), least squares solution calculators (e.g., running an iterative snap-shot least squares method), Gaussian processes, and/or any suitable estimator can be used. In variants that use a Kalman filter, the differenced carrier phase data can be accommodated using stochastic cloning (e.g., augmenting the state vector by cloning certain substates at reference epochs and modelling the measurements as differences between current and cloned, previous states), by modifying a measurement design matrix (which can provide a technical advantage as no states are required to model displacements in the fusion engine), and/or can otherwise be accommodated. In a specific example, a fusion engine that processes computed doppler (and/or another source of an average velocity since a reference epoch) can be modified to accommodate the difference satellite observations (e.g., difference carrier phases) by multiplying the measurement sensitivity matrix of the fusion engine by the time since the reference epoch and projecting on to the line-of-sight vector of the satellites.

In variants, the rover positioning solution (and/or protection level) can be transmitted to an external system, stored (e.g., cached), used to operate and/or control an external system, used to generate operation instructions for an external system (e.g., using a GNSS receiver computing system, an external system computing system, etc.), and/or used in any manner.

In an illustrative example, as shown for instance in FIG. 3, a method can include: receiving satellite observations, refining (e.g., filtering, removing, etc.) satellite observations, determining a satellite PVA (e.g., position, velocity, acceleration, higher order derivatives of position with respect to time, etc.), refining the composed satellite observations (e.g., satellite observations and their associated satellite PVA), determining a variance model, selecting a set of satellites, applying corrections to the satellite observations, determining time differences for each satellite observation of the set of satellite observations relative to a reference epoch, detect outliers in the differenced data, and updating a filter state using the inliers (e.g., determining a receiver positioning solution).

Figure 4:
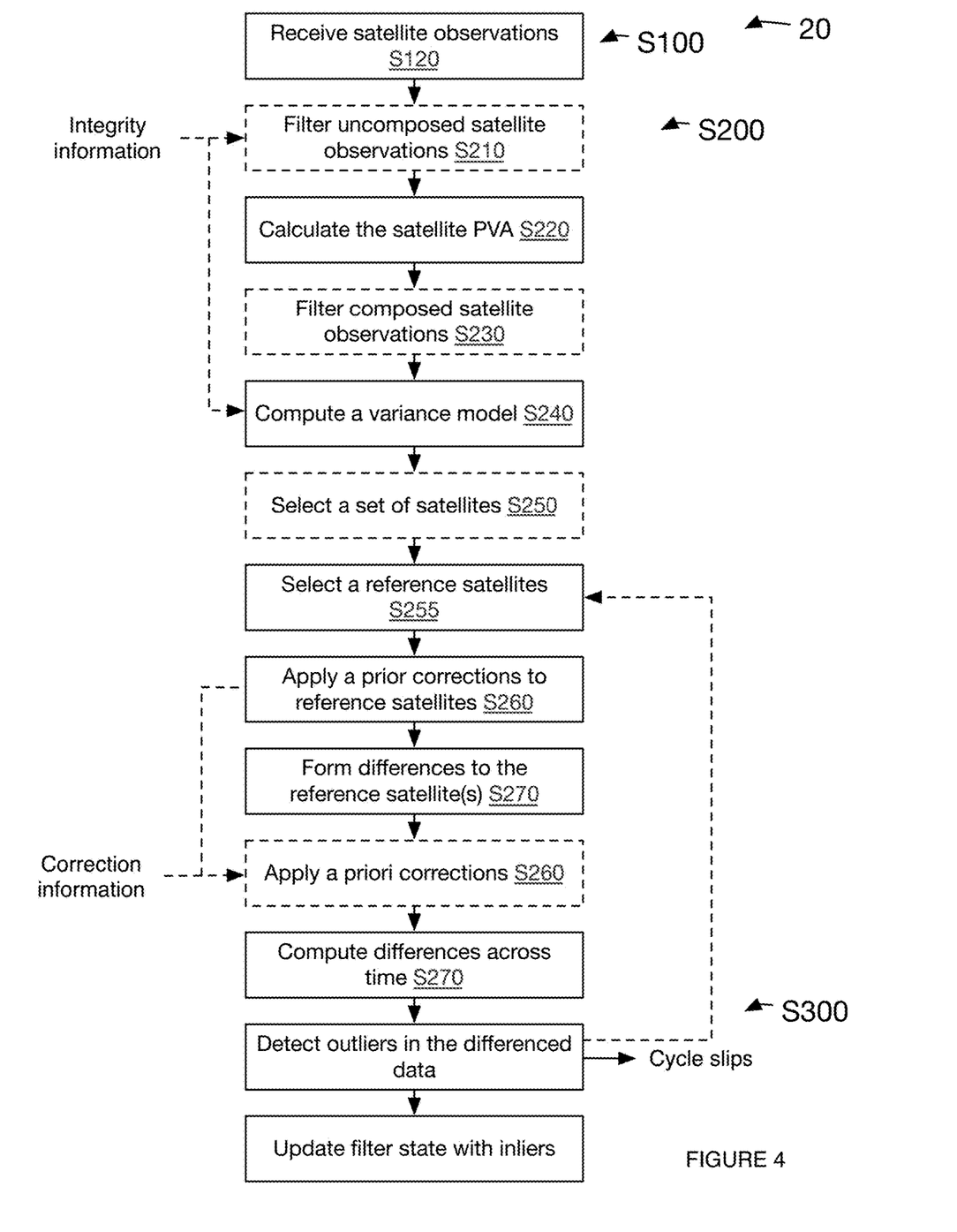
FIG. 4 is a schematic representation of an example of determining a positioning solution using double differencing.

In a second illustrative example, as shown for instance in FIG. 4, a method can include: receiving satellite observations, refining (e.g., filtering, removing, etc.) satellite observations, determining a satellite PVA, refining the composed satellite observations (e.g., satellite observations and their associated satellite PVA), determining a variance model, selecting a set of satellites, selecting reference satellite(s) (e.g., from the set of selected satellites, from the set of measured satellites, etc.), correcting the satellite observations associated with the reference satellite, applying corrections to the satellite observations, determining a differenced satellite observation for each satellite observation relative to the reference satellite and a reference epoch, detect outliers in the differenced data (e.g., differenced satellite observation), and updating a filter state using the inliers (e.g., determining a receiver positioning solution).

The methods of the preferred embodiment and variations thereof can be embodied and/or implemented at least in part as a machine configured to receive a computer-readable medium storing computer-readable instructions. The instructions are preferably executed by computer-executable components integrated with a system for GNSS PVT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for determining a positioning solution of a rover comprising:

receiving a set of satellite signals associated with one or more satellite constellations;

selecting a first subset of satellite signals from the set of satellite signals;

determining a satellite position, velocity, and acceleration (PVA) for each satellite associated with a satellite signal in the first subset of satellite signals;

determining a variance model based on the satellite PVA;

selecting a reference satellite from the satellites associated with a satellite signal in the first subset of satellite signals;

applying an a-priori correction to each of the satellite signals in the filtered first subset of satellite signals;

determining a set of differenced satellite signals between a satellite signal associated with the reference satellite and each of the satellite signals associated with the remaining satellites;

determining a set of time differenced satellite signals between the differenced satellite signals from a current epoch and a previous epoch; and determining the positioning solution of the rover using a fusion engine comprising an estimator that processes the set of time differenced satellite signals, inertial measurement unit (IMU) data, and the variance model, wherein the estimator uses stochastic cloning to model displacements using the set of time differenced satellite signals.

2. The method of claim 1, further comprising detecting outliers in the set of time differenced satellite signals based on a normalized innovation squared statistic.

3. The method of claim 1, wherein applying the a-priori correction to the satellites comprises determining the a-priori corrections using an atmospheric correction model selected from global zenith tropospheric delay model (GZTD), Satellite-based Augmentation System (SBAS), UNB3, or UNB3m models.

4. The method of claim 3, wherein determining the a-priori corrections further comprises determining a satellite clock error using IGS model, IGU-P model, or RES-P5 model.

5. The method of claim 1, wherein the reference satellite is shared across different satellite constellations.

6. The method of claim 1, wherein selecting the first subset of satellite signals comprises determining satellite signals from the set of satellite signals to include in the first subset of satellite signals based on a carrier to noise density, a carrier lock time, a half cycle flag, or an elevation of a satellite associated with each satellite signal of the set of satellite signals.

7. The method of claim 1, wherein selecting the reference satellite comprises selecting a satellite with a highest elevation angle.

8. The method of claim 1, wherein the variance model does not consider cycle slips.

9. The method of claim 8, wherein the variance model overbounds a thermal measurement noise, a change in orbit error projected onto a line-of-sight vector, satellite clock error change between the current epoch and the previous epoch, change in troposphere delay, change in ionospheric delay, and multipath effects.

10. The method of claim 1, wherein the first subset of satellite signals comprises satellite signals associated with at most four satellites.

11. A system for determining a positioning solution of a body comprising:
a body comprising:
a magnetometer or an inertial measurement unit (IMU) comprising at least one of an accelerometer or a gyroscope;
an antenna configured to receive satellite signals corresponding to one or more satellite frequencies associated one or more satellite constellations; and
a processor comprising a fusion engine comprising an estimator configured to determine the positioning solution of the body based on IMU or magnetometer data measured by the IMU or the magnetometer and double differenced carrier phase information from a time difference of carrier phase (TDCP) module, wherein the estimator uses stochastic cloning to model displacements using the double differenced carrier phase information, wherein the TDCP module is configured to:
select a subset of the satellite signals to generate a subset of satellite signals based on a quality of satellites associated with the satellite signals;
select a reference satellite from satellites associated with the subset of satellite signals;
apply an a-priori correction to the satellite signals associated with the subset of satellite signals to generated corrected satellite signals;
determine the double-differenced carrier phase information from the corrected satellite signals by:
determining differenced satellite signals between satellite signals associated with the reference satellite and each of the satellite signals associated with the remaining satellites; and
determininge a set of time differenced satellite signals between the differenced satellite signals from a current epoch and a previous epoch.

12. The system of claim 11, wherein the TDCP module is further configured to
determine a satellite position, velocity, and acceleration (PVA) for each satellite associated with a satellite signal in the subset of satellite signals;
select a second subset of satellite signals from the subset of satellite signals based on the satellite PVA; and
determine a variance model based on the satellite PVA; wherein the fusion engine is further configured to determine the positioning solution of the body based on the variance model.

13. The system of claim 12, wherein the variance model does not account for cycle slips.

14. The system of claim 12, wherein the variance model overbounds a thermal measurement noise, a change in orbit error projected onto a line-of-sight vector, satellite clock error change between the current epoch and the previous epoch, change in troposphere delay, change in ionospheric delay, and multipath effects.

15. The system of claim 11, wherein selecting the reference satellite comprises selecting a satellite with a highest elevation angle.

16. The system of claim 15, where satellites from different satellite constellations are differenced to the reference satellite.

17. The system of Claim 11, wherein applying the a-priori correction to the satellites comprises determining the a-priori correction using:
an atmospheric correction determined using one of global zenith tropospheric delay model (GZTD), Satellite-based Augmentation System (SBAS), UNB3 model, or UNB3m model; and
a satellite clock correction determined using one of IGS model, IGU-P model, or RES-P5 model.

18. The system of claim 11, wherein selecting the subset of satellite signals comprises determining satellite signals from the satellite signals to include in the filtered set of satellite signals based on a carrier to noise density, a carrier lock time, a half cycle flag, or an elevation of a respective satellite.

19. The system of claim 11, wherein the TDCP module is further configured to detect outliers in the double differenced carrier phase information based on a normalized innovation squared statistic, wherein the outliers are removed from the double differenced carrier phase information.

20. The system of claim 19, wherein the outlier-removed double differenced carrier phase information comprises data from at most four distinct satellites.

21. The system of claim 11, wherein the fusion engine comprises the TDCP module.

* * * * *

UNITED STATES PATENT AND TRADEMARK OFFICE
CERTIFICATE OF CORRECTION

PATENT NO. : 11,906,640 B2
APPLICATION NO. : 18/115963
DATED : February 20, 2024
INVENTOR(S) : Christian Reimer, Joseph Angelo and Sebastien Carcanague It is certified that error appears in the above-identified patent and that said Letters Patent is hereby corrected as shown below:

On the Title Page

Page 3, Column 1, Foreign Patent Documents, Line 23, Delete "IN" and insert --CN-- therefor Page 3, Column 1, Other Publications, Lines 4-5, Delete "andmulti-frequency" and insert --and multi-frequency-- therefor In the Claims Column 16, Line 56, In Claim 1, before "first", delete "filtered"

Signed and Sealed this
Second Day of April, 2024

*Katherine Kelly Vidal*

Katherine Kelly Vidal
*Director of the United States Patent and Trademark Office*